(12) United States Patent
Zhang et al.

(10) Patent No.: US 12,349,156 B2
(45) Date of Patent: Jul. 1, 2025

(54) METHOD AND APPARATUS FOR REDUCING OPERATIONS OF MONITORING PDCCH

(71) Applicant: Lenovo (Beijing) Ltd., Beijing (CN)

(72) Inventors: Yuantao Zhang, Dongcheng Distric (CN); Yi Zhang, Chao Yang District (CN); Zhi Yan, Xicheng District (CN); Hongmei Liu, Changping District (CN); Haiming Wang, Xicheng District (CN)

(73) Assignee: Lenovo (Beijing) Ltd., Beijing (CN)

( * ) Notice: Subject to any disclaimer, the term of this patent is extended or adjusted under 35 U.S.C. 154(b) by 531 days.

(21) Appl. No.: 17/789,589

(22) PCT Filed: Jan. 10, 2020

(86) PCT No.: PCT/CN2020/071475
§ 371 (c)(1),
(2) Date: Jun. 28, 2022

(87) PCT Pub. No.: WO2021/138906
PCT Pub. Date: Jul. 15, 2021

(65) Prior Publication Data
US 2023/0030756 A1    Feb. 2, 2023

(51) Int. Cl.
*H04W 72/23* (2023.01)
*H04L 5/00* (2006.01)

(52) U.S. Cl.
CPC .......... *H04W 72/23* (2023.01); *H04L 5/0051* (2013.01); *H04L 5/0098* (2013.01)

(58) Field of Classification Search
CPC .............. H04W 72/23; H04W 52/0216; H04L 5/0051; H04L 5/0098; H04L 5/0053; Y02D 30/70
(Continued)

(56) References Cited

U.S. PATENT DOCUMENTS 12,193,104 B2 *  1/2025  He .................... H04L 41/0896
2019/0305867 A1  10/2019  Tseng et al.
(Continued)

FOREIGN PATENT DOCUMENTS

CN     109417762 A    3/2019
CN     110313210 A    10/2019
(Continued)

OTHER PUBLICATIONS

20912689.5 , "Extended European Search Report", EP Application No. 20912689.5, Aug. 29, 2023, 13 pages.
(Continued)

*Primary Examiner* — Kwang B Yao
*Assistant Examiner* — Syed M Bokhari
(74) *Attorney, Agent, or Firm* — FIG. 1 Patents (57) ABSTRACT

Embodiments of the present application relate to a method and an apparatus for reducing operations of monitoring PDCCH. According to an embodiment of the present application, a method can include: receiving configuration information indicating a plurality of search space sets and an activation or deactivation state for each search space set of the plurality of search space sets; and receiving an activation-deactivation indication in first downlink control information (DCI) in a first search space set in an activation state of the plurality of search space sets, wherein the activation-deactivation indication is configured to: trigger switching at least one second search space set of the plurality of search space sets from a deactivation state to an activation state; or trigger switching the at least one second search space set of the plurality of search space sets from an activation state to a deactivation state. Embodiments of the present application can save power and enhance the battery lifetime for the NR-Light UEs.

20 Claims, 8 Drawing Sheets

(58) Field of Classification Search
USPC .......................................................... 370/329
See application file for complete search history.

(56) References Cited

U.S. PATENT DOCUMENTS

| | | | |
|---|---|---|---|
| 2020/0092866 A1* | 3/2020 | Xue ..................... | H04W 72/04 |
| 2020/0221428 A1 | 7/2020 | Moon et al. | |
| 2020/0280970 A1* | 9/2020 | Takeda .................. | H04L 5/0053 |
| 2020/0351682 A1* | 11/2020 | Cirik ..................... | H04W 76/28 |
| 2021/0195600 A1* | 6/2021 | Khoshnevisan ...... | H04W 72/53 |
| 2022/0256585 A1* | 8/2022 | Yoon ..................... | H04B 7/0408 |

FOREIGN PATENT DOCUMENTS

| | | |
|---|---|---|
| WO | 2019031850 A1 | 2/2019 |
| WO | 2019185027 A1 | 10/2019 |

OTHER PUBLICATIONS

Huawei, et al., "Discussion on the impact of DCI-based power saving adaptation", 3GPP TSG-RAN2 Meeting#105bis, R2-1904968, Xian, China [retrieved Oct. 30, 2023]. Retrieved from the Internet <https://www.3gpp.org/ftp/tsg_ran/WG2_RL2/TSGR2_105bis/Docs?sortby=namerev>, Apr. 2019, 3 pages.

Samsung, "On PDCCH-based power saving signal/channel", 3GPP TSG RAN WG1 RAN1 Meeting #96bis, R1-1904461, Xi'an, China [retrieved Oct. 30, 2023]. Retrieved from the Internet <https://www.3gpp.org/ftp/tsg_ran/WG1_RL1/TSGR1_96b/Docs>, Apr. 2019, 7 pages.

Huawei, Hisilicon, "Further discussion on the impact of DCI-based PDCCH skipping", 3GPP TSG-RAN2 Meeting#106, R2-1906904 Reno, USA [retrieved Aug. 16, 2022]. Retrieved from the internet <https://www.3gpp.org/ftp/TSG_RAN/WG2_RL2/TSGR2_106/Docs/>., May 2019, 6 Pages.

PCT/CN2020/071475, "International Preliminary Report on Patentability", PCT Application No. PCT/CN2020/071475, Jul. 21, 2022, 6 pages.

PCT/CN2020/071475, "International Search Report and Written Opinion", PCT Application No. PCT/CN2020/071475, Sep. 25, 2020, 7 pages.

"Foreign Office Action", CN Application No. 202080092256.3, Dec. 24, 2024, 18 pages.

* cited by examiner

METHOD AND APPARATUS FOR REDUCING OPERATIONS OF MONITORING PDCCH

TECHNICAL FIELD

Embodiments of the present application generally relate to wireless communication technology, and in particular to a method and an apparatus for reducing the operations of monitoring physical downlink control channel (PDCCH).

BACKGROUND

In 3GPP new radio (NR) scenario, a reduced capability NR device is introduced. The reduced capability NR device may also be referred to as a NR-Light user equipment (UE), which may refer to a UE that can perform signal transmission (e.g. downlink (DL) transmission) within a relatively narrow bandwidth (e.g. from a few Mbps to tens of Mbps), operate with low power consumption, operate with few resources, or operate with flexible latency requirement, etc.

Currently, the NR-Light UEs can serve in three types of application scenarios, such as acting as industrial wireless sensors, video surveillances and wearables. One objective of NR-Light UEs, among others, is to achieve UE power saving and battery lifetime enhancement. More specifically, PDCCH monitoring reduction for the NR-Light UEs is one way to save power and enhance the battery lifetime in the NR scenario.

At least given the above, the industry desires an improved technology for reducing monitoring PDCCH for the UE, especially for the NR-Light UEs.

SUMMARY OF THE APPLICATION

Some embodiments of the present application provide a technical solution for reducing monitoring PDCCH for NR-Light UEs.

According to some embodiments of the present application, a method may include: receiving configuration information indicating a plurality of search space sets and an activation or deactivation state for each search space set of the plurality of search space sets, and receiving an activation-deactivation indication in first downlink control information (DCI) in a first search space set in an activation state of the plurality of search space sets. The activation-deactivation indication is configured to: trigger switching at least one second search space set of the plurality of search space sets from a deactivation state to an activation state; or trigger switching the at least one second search space set of the plurality of search space sets from an activation state to a deactivation state.

In an embodiment of the present application, the first search space set in the activation state of the plurality of search spaces may be configured based on a first control resource set (CORESET), and the at least one second search space set in the deactivation state of the plurality of search spaces may be configured based a second CORESET.

In another embodiment of the present application, the first DCI may be fallback DCI received in the first search space set, and the fallback DCI may include at least one of: DCI format 0_0 and DCI format 1_0.

In yet another embodiment of the present application, the at least one second search space set may be associated with full capability DCI, and the full capability DCI may include at least one of: DCI format 0_1 and DCI format 1_1.

In yet another embodiment of the present application, the method may include: switching the at least one second search space set from the deactivation state to the activation state in response to receiving the activation-deactivation indication, which is configured to trigger switching at least one second search space set of the plurality of search space sets from the deactivation state to the activation state in the first search space set; monitoring both the first search space set and the at least one second search space set after receiving the first DCI; and in response to receiving second DCI in any one of the at least one second search space set, switching the first search space set from the activation state to the deactivation state.

In yet another embodiment of the present application, the method may include: starting a timer for the second search space set in which the second DCI is received in response to receiving the second DCI; in the case that third DCI is received in the second search space set before the timer expires, restarting the timer; and in the case that no DCI is received in the second search space set before the timer expires: switching the second search space set from the activation state to the deactivation state; and switching the first search space set from the deactivation state to the activation state.

In yet another embodiment of the present application, the method may include: switching the at least one second search space set from the deactivation state to the activation state in response to receiving the activation-deactivation indication which is configured to trigger switching at least one second search space set of the plurality of search space sets from the deactivation state to the activation state in the first search space set; and monitoring both the first search space set and the at least one second search space set after receiving the first DCI.

In yet another embodiment of the present application, the method may include: starting a timer for each second search space set respectively in response to the at least one second search space set being switched to the activation state; in the case that third DCI is received in the corresponding second search space set before the timer expires, restarting the timer; and in the case that no DCI is received in the corresponding second search space set before the timer expires, switching the corresponding second search space set from the activation state to the deactivation state.

According to some other embodiments of the present application, a method may include: transmitting configuration information indicating a plurality of search space sets and an activation or deactivation state for each search space set of the plurality of search space sets, and transmitting an activation-deactivation indication in first downlink control information (DCI) in a physical resource of a first search space set in an activation state of the plurality of search space sets. The activation-deactivation indication is configured to: trigger switching at least one second search space set of the plurality of search space sets from a deactivation state to an activation state, or trigger switching the at least one second search space set of the plurality of search space sets from an activation state to a deactivation state.

Some embodiments of the present application also provide an apparatus, include: at least one non-transitory computer-readable medium having computer executable instructions stored therein, at least one receiver; at least one transmitter; and at least one processor coupled to the at least one non-transitory computer-readable medium, the at least one receiver and the at least one transmitter. The computer executable instructions are programmed to implement any method as stated above with the at least one receiver, the at least one transmitter and the at least one processor.

Embodiments of the present application provide a technical solution for reducing monitoring PDCCH for NR-Light UEs. Accordingly, embodiments of the present application can save power and enhance the battery lifetime for the NR-Light UEs.

BRIEF DESCRIPTION OF THE DRAWINGS

In order to describe the manner in which advantages and features of the application can be obtained, a description of the application is rendered by reference to specific embodiments thereof, which are illustrated in the appended drawings. These drawings depict only example embodiments of the application and are not therefore to be considered limiting of its scope.

DETAILED DESCRIPTION

The detailed description of the appended drawings is intended as a description of preferred embodiments of the present application, and is not intended to represent the only form in which the present application may be practiced. It should be understood that the same or equivalent functions may be accomplished by different embodiments that are intended to be encompassed within the spirit and scope of the present application.

Reference will now be made in detail to some embodiments of the present application, examples of which are illustrated in the accompanying drawings.

The detailed description of the appended drawings is intended as a description of preferred embodiments of the present application, and is not intended to represent the only form in which the present application may be practiced. It should be understood that the same or equivalent functions may be accomplished by different embodiments that are intended to be encompassed within the spirit and scope of the present application.

Reference will now be made in detail to some embodiments of the present application, examples of which are illustrated in the accompanying drawings.

Figure 1:
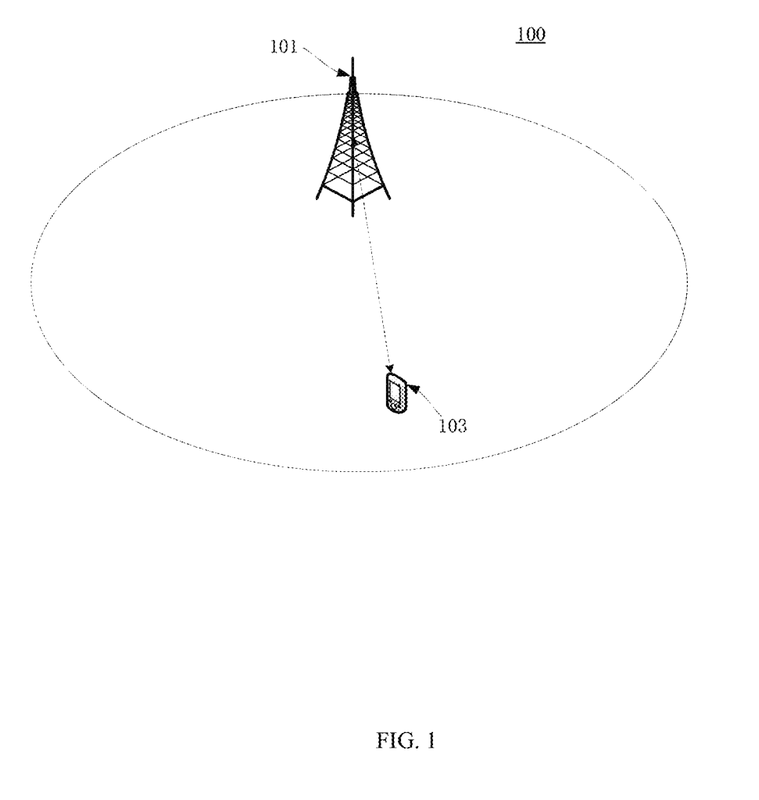
FIG. 1 is a schematic diagram illustrating an exemplary wireless communication system according to some embodiments of the present application.

FIG. 1 is a schematic diagram illustrating an exemplary wireless communication system 100 according to an embodiment of the present application.

As shown in FIG. 1, the wireless communication system 100 can include at least one base station (BS) 101 and at least one UE 103. Although a specific number of BSs 101 and UEs 103, e.g., only one BS 101 and one UE 103 are depicted in FIG. 1, one skilled in the art will recognize that any number of the BSs 101 and UEs 103 may be included in the wireless communication system 100.

The BS 101 may be distributed over a geographic region, and generally be a part of a radio access network that may include one or more controllers communicably coupled to one or more corresponding BSs 101. In some embodiments of the present application, each BS 101 may also be referred to as an access point, an access terminal, a base, a macro cell, a Node-B, an evolved Node B (eNB), a gNB, a Home Node-B, a relay node, a device, or described using other terminology used in the art.

According to some embodiments of the present application, the UE 103 may be computing devices, such as desktop computers, laptop computers, personal digital assistants (PDAs), tablet computers, smart televisions (e.g., televisions connected to the Internet), set-top boxes, game consoles, security systems (including security cameras), vehicle on-board computers, network devices (e.g., routers, switches, and modems), or the like. According to some other embodiments of the present application, the UE 103 may also be a portable wireless communication device, a smart phone, a cellular telephone, a flip phone, a device having a subscriber identity module, a personal computer, a selective call receiver, or any other device that is capable of sending and receiving communication signals on a wireless network. According to some other embodiments of the present application, the UE 103 may be a NR-Light UE. The NR-Light UE may have smaller bandwidth to enable several Mbps to tens of Mbps downlink (DL) throughput, lower power consumption to enable longer UE battery life, cost reduction, relaxed latency requirement, etc. For example, the UE 103 may be an industrial sensor, a smart wearable, a video surveillance, or other devices with the characteristics of NR-Light UEs.

In addition, the UE 103 may also be referred to as a subscriber unit, a mobile, a mobile station, a user, a terminal, a mobile terminal, a wireless terminal, a fixed terminal, a subscriber station, a user terminal, or a device, or described using other terminology used in the art.

The BS 101 may configure at least one search space (SS) set for fallback DCI (e.g., DCI format 0_0 and DCI format 1_0) for the UE 103 in order to support e.g., scheduling in uncertainty phase when performing RRC reconfiguration. A search space is a set of candidate control channels (e.g., PDCCHs) formed by CCEs at a given aggregation level, which a UE is supposed to attempt to decode. A search space set is a set of search spaces, each of which corresponds to an aggregation level. A search space set is associated with a control resource set (CORESET) and is configured through an RRC signaling. The fallback DCI may have low overhead but have low capability, e.g., supporting only rank-1 single-user multiple input multiple output (SU-MIMO) while not supporting multi-user multiple input multiple output (MU-MIMO).

The BS 101 may also configure at least one other UE specific search space set for full capability DCI (e.g., DCI format 1_0 and DCI format 1_1) for the UE 103 in order to schedule e.g., high rank transmission that is required by enhanced mobile broadband (eMBB) or ultra reliable low latency communications (URLLC) services. However, the full capability DCI may have higher overhead than the fallback DCI.

A UE 103 needs to monitor all the configured search space sets. In order to reduce power consumption on PDCCH monitoring, at least one of the following options could be used: configuring a UE 103 with few search space sets and control resource sets (CORESETs); configuring a UE 103 with few aggregation levels and/or few PDCCH candidates per aggregation level; and configuring a UE 103 with high monitoring periodicity.

For example, assuming that only one search space set with fallback DCI may be configured for a UE 103 for UP data scheduling, power consumption on PDCCH monitoring can be reduced e.g., during a period when no data packet is scheduled for the UE 103. However, due to the low capability of the fallback DCI, when a large packet comes for scheduling, more DCIs for the data scheduling and more data blocks need to be received because of low capability of the fallback DCI. Correspondingly, the UE 103 needs to keep monitoring DCI in the only one configured search space set, performing more channel estimation operations and channel decoding than that for a search space set with full DCI. More power is consumed instead of being saved, and the technical problem cannot be completely solved.

Embodiments of the present disclosure provide a technical solution at least capable of reducing unnecessary PDCCH monitoring, e.g., search space set monitoring in the UE side, which can at least solving the above technical problems. More details on the embodiments of the present application will be illustrated in the following text in combination with the appended drawings.

Figure 2:
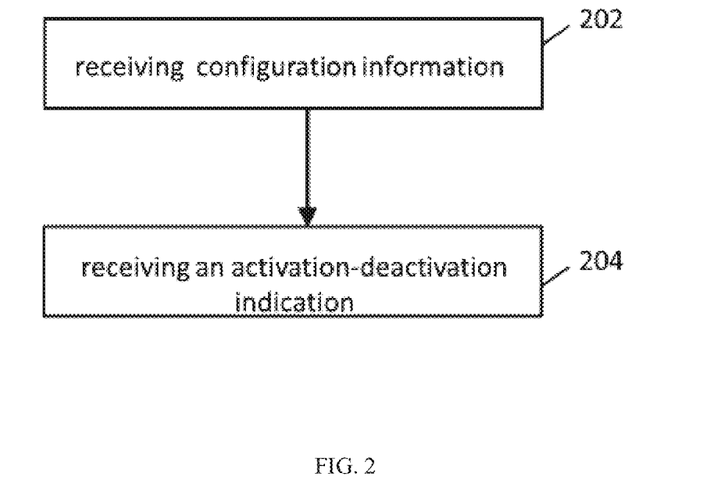
FIG. 2 illustrates a flow chart illustrating a method for reducing operations of monitoring PDCCH according to some embodiments of the present application.

FIG. 2 is a flow chart illustrating a method for reducing operations of monitoring PDCCH according to some embodiments of the present application. The method may be performed by a UE 103 (for example, a NR-Light UE) as shown in FIG. 1.

As shown in FIG. 2, in step 202, the UE 103 may receive configuration information from a base station (for example, the base station 101 as shown in FIG. 1). The configuration information may indicate a plurality of search space sets, and an activation or deactivation state for each search space set of the plurality of search space sets. Each search space set may be associated with fallback DCI or full capability DCI. The fallback DCI may include at least one of: DCI format 0_0 and DCI format 1_0. The full capability DCI may include at least one of: DCI format 0_1 and DCI format 1_1.

In the case that the configuration information indicates that the search space set is in an activation state, the UE 103 may monitor the search space set to detect DCI in the search space set at each PDCCH monitoring occasion for the search space set. In the case that the configuration information indicates that the search space set is in a deactivation state, the UE 103 may not monitor the search space set to detect downlink control information (DCI) in the search space set at each PDCCH monitoring occasion for the search space set. The PDCCH monitoring occasion for the search space set can be determined based on the offset parameter and the periodicity parameter configured for the search space set by the BS 101.

In step 204, the UE 103 may receive an activation-deactivation indication in a DCI in a search space set in an activation state of the plurality of search space sets. The activation-deactivation indication may be configured to: trigger switching at least one second search space set of the plurality of search space sets from a deactivation state to an activation state, or trigger switching the at least one second search space set of the plurality of search space sets from an activation state to a deactivation state. According to some embodiments of the present application, one search space set may be configured to associate with one or more other search space sets, by the base station 101, such that the UE 103 may use the activation-deactivation indication received in the one search space set to switch at least one of the associated search space sets between the activation state and deactivation states.

For example, the BS 101 may configure that a first search space set is associated with one or more second search space sets. The UE 103 may receive an activation-deactivation indication in first DCI in a first search space set in an activation state of the plurality of search space sets. The UE 103 may use the activation-deactivation indication received in the first search space set to switch at least one of the associated search space sets between the activation state and deactivation states. In some embodiments of the present application, the at least one second search space set is in deactivation state.

According to some embodiments of the present application, the first search space set in the activation state of the plurality of search spaces may be configured based on a first CORESET, and the at least one second search space set in the deactivation state of the plurality of search spaces may be configured based a second CORESET. In other words, the first search space set in the activation state of the plurality of search spaces may be associated with a first CORESET, and the at least one second search space set in the deactivation state of the plurality of search spaces may be associated with a second CORESET. The association relationship between the search space set and the CORESET may be configured by the BS 101 through a radio resource control (RRC) signalling.

A CORESET may indicate the frequency band occupied by a physical resource in the frequency domain and the number of orthogonal frequency division multiplexing (OFDM) symbols occupied by the physical resource in the time domain. According to some embodiments of the application, the first CORESET is the same as the second CORESET. According to some other embodiments of the application, the first CORESET is different from the second CORESET. For example, in an embodiment of the present application, the first CORESET and the second CORESET may be configured with different carrier frequencies. In another embodiment of the application, the first CORESET and the second CORESET may be configured with different bandwidth parts (BWPs). In yet another embodiment of the application, the first CORESET and the second CORESET may be configured with the same BWP but different CORESET configuration parameters. The CORESET configuration parameters may include parameters for configuring the CORESET in the existing or future technology, e.g., the number of OFDM symbols occupied by the CORESET in the time domain.

In an embodiment of the present application, the first search space set in an activation state may be associated with fallback DCI. That is, the first DCI may be fallback DCI. The fallback DCI may include at least one of: DCI format 0_0; and DCI format 1_0.

In another embodiment of the present application, the at least one second search space set may be associated with full capability DCI. The full capability DCI may include at least one of: DCI format 0_1; and DCI format 1_1.

In yet another embodiment of the present application, the first DCI is one of the following: DCI for scheduling a physical uplink shared channel (PUSCH) transmission; DCI for scheduling a physical downlink shared channel (PDSCH) transmission; and DCI dedicated for search space set activation and deactivation.

According to some embodiments of the present application, after receiving the activation-deactivation indication in first DCI, the UE 103 may switch the at least one second search space set from the deactivation state to the activation state in the case that the activation-deactivation indication is configured to trigger switching at least one second search space set of the plurality of search space sets from a deactivation state to an activation state. The UE 103 may also monitor both the first search space set and the at least one second search space set. In response to receiving second DCI in any one of the at least one second search space set, the UE 103 may switch the first search space set from the activation state to the deactivation state. Accordingly, the UE 103 will not monitor the first search space set in the deactivation state, and power on monitoring the first search space set is saved.

For the second search space set in which the second DCI is received, the UE 103 may start a timer in response to receiving the second DCI. In the case that another DCI, i.e., third DCI is received in the second search space set before the timer expires, the UE 103 may restart the timer. In the case that no DCI is received in the second search space set before the timer expires, the UE 103 may switch the second search space set from the activation state to the deactivation state and switch the first search space set from the deactivation state to the activation state. In an embodiment of the present application, each second search space set of the at least one second search space set may be associated with a corresponding timer. The period of the timer may be configured by the BS 101. The timers for different second search space sets may be the same or different from each other.

Figure 3:
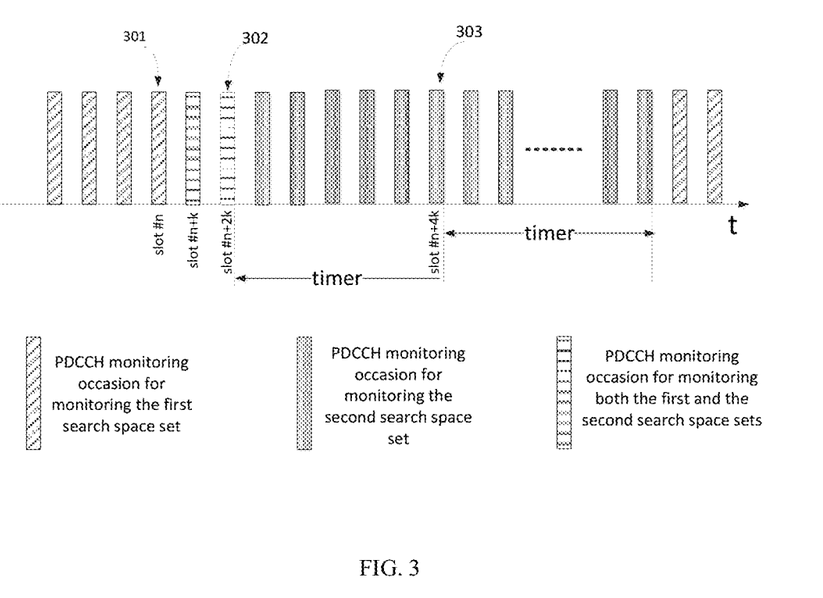
FIG. 3 illustrates a schematic timing diagram for reducing operations of monitoring PDCCH according to some embodiments of the present application.

FIG. 3 illustrates a schematic timing diagram for reducing operations of monitoring PDCCH according to some embodiments of the present application. Each slot shown in FIG. 3 is a PDCCH monitoring occasion for monitoring one or more search space sets in the activation state by the UE 103.

For simplicity, two exemplary search space sets, i.e., a first search space set in the activation state and a second search space set in a deactivation state are configured for a UE 103 via the configuration information. The first search space set may be configured with fallback DCI and the second search space set may be configured with full capability DCI before slot #n to save overhead and power. Slot #n may be a PDCCH monitoring occasion for the first search space set, wherein n is an integer larger than 0.

When the UE 103 needs to transmit a large data packet to the BS 101, the BS 101 may decide to activate the second search space set to schedule the data transmission of UE 103 by full capability DCI, thereby enabling efficient data transmission. Thus, the BS 103 may transmit an activation-deactivation indication 301 via DCI in a physical resource of the first search space set, e.g., first DCI 301 to trigger the UE 103 to switch the second search space set from a deactivation state to an activation state at slot #n. When the UE 103 monitors the first search space set at slot #n, the UE 103 may detect the first DCI 301 in the first search space set and receive the activation-deactivation indication from the BS 101 to trigger switching the second search space set from a deactivation state to an activation state. In response to receiving the activation-deactivation indication, the UE 103 will switch the second search space set from the deactivation state to the activation state.

Accordingly, the UE 103 will monitor both the first search space set in activation state and the second search space set in activation state to detect DCI in the following PDCCH monitoring occasions, respectively. For example, after decoding the first DCI, the UE 103 may switch the second search space set from the deactivation state to the activation state and start to monitor the second search space set at slot #n+k, wherein n is an integer larger than 0, k is the periodicity of PDCCH monitoring occasion and is an integer larger than 0.

To save power, the UE 103 may switch the first search space set into the deactivation state. In some embodiments of the present application, the UE 103 may switch the first search space set into the deactivation state after confirming that the BS 101 can transmit control information on the second search space set to avoid possible misalignments between the UE 103 and BS 101.

For example, in one possible misalignment situation, the UE 103 may detect the first DCI in the first search space set which is used for PDSCH scheduling, and feedback ACK/NACK to the BS 101. However, the BS 101 does not detect the ACK/NACK, and keeps transmitting the DCI in the first search space set. If the UE 103 directly switches the first search space set to the deactivation state after receiving the first DCI in the first search space set, the UE 103 may not receive any DCI from the BS 101.

In another possible misalignment situation, the UE 103 may detect the first DCI in the first search space set which is used for PUSCH scheduling, and transmit PUSCH transmission to the BS 101. However, the BS 101 does not detect the PUSCH transmission, and keep transmitting the DCI in the first search space set. Similarly, if the UE 103 directly switches the first search space set to the deactivation state after receiving the first DCI in the first search space set, the UE 103 may not receive any DCI from the BS 101.

Therefore, monitoring the first search space set until it receives second DCI in the second search space set can ensure that the UE receives the DCI from the BS 101 timely, thereby facilitating the data transmission between the UE 103 and the BS 101.

Specifically, according to some embodiments of the present application, at a following PDCCH monitoring occasion, e.g., slot #n+2k, the UE 103 may detect another DCI, i.e., the second DCI 302 in the second search space set. After receiving the second DCI 302 at slot #n+2k, the UE 103 will switch the first search space set from the activation state to the deactivation state. Although FIG. 3 illustrates that the UE 103 monitors the first search space set and the second search space at the same PDCCH monitoring occasions (e.g., slot #n+k and slot #n+2k), persons skilled in the art can understand that the PDCCH monitoring occasions respectively for the first search space set and the second search space may be different according to some embodiments of the present application.

When no large data packet to be transmitted, the BS 101 may turn to schedule the UE 103 by fallback DCI to save overhead. The UE 103 may return to only monitor the first search space set with fallback DCI. According to some embodiments of the present application, a timer can be configured to achieve that. Specifically, in response to receiving the second DCI 302 in slot #n+2k, the UE 103 may start a timer with a period, e.g., slot #n+2k to slot #n+8k for the second search space set. In the case that further DCI, i.e., the third DCI 303 is received in the second search space set at a PDCCH monitoring occasion, e.g., slot #n+4k before the timer expires, the UE 103 may restart the timer. In the case that no DCI is received in the second search space set before the timer expires, the UE 103 may switch the second search space set from the activation state to the deactivation state and switch the first search space set from the deactivation state to the activation state.

Although the above example in FIG. 3 illustrates the procedure for switching one second search space set based on the activation-deactivation indication, persons skilled in the art can understood the above procedure can also be applied to the situation where the at least one second search space set is two or more second search space sets.

For example, in the case that the at least one second search space set includes two or more second search space sets, after receiving the activation-deactivation indication in first DCI in the first search space set, the UE 103 may switch all of the two or more second search space sets from a deactivation state to an activation state, and monitor all of the two or more second search space sets to detect DCI at their PDCCH monitoring occasions. In the case that the UE 103 receives DCI in any one of the two or more second search space sets, the UE 103 may switch the first search space set from the activation state to the deactivation state. Then, for the second search space set in which the second DCI is received, the UE 103 may start a corresponding timer for the second search space. For example, assuming that the UE 103 receives DCI from two second search space sets, for each second search space set, the UE 103 may start a corresponding timer, and perform the operations for each second search space set according to the above illustrations.

According to an embodiment of the present application, in the case that two or more second search space sets are switched to the activation state, the UE 103 may switch the first search space set from the deactivation state to the activation state in response to any one of the second search space set has been switched from the deactivation state to the activation state. According to another embodiment of the present application, the UE 103 may switch the first search space set from the deactivation state to the activation state in response to all of the two or more second search space sets have been switched from the activation state to the deactivation state.

According to some other embodiments of the present application, after receiving the activation-deactivation indication in first DCI, the UE 103 may switch the at least one second search space set from the deactivation state to the activation state in the case that the activation-deactivation indication is configured to trigger switching at least one second search space set of the plurality of search space sets from a deactivation state to an activation state, the UE 103 may also monitor both the first search space set and the at least one second search space set. The UE 103 retains the first search space set in the activation state while watches for switching the second search space set into the deactivation state again by a configured timer.

In an embodiment of the present application, the UE 103 may start a timer for each second search space set respectively in response to the at least one second search space set being switched to the activation state. In the case that third DCI is received in the corresponding second search space set before the timer expires, the UE 103 may restart the timer. In the case that no DCI is received in the corresponding second search space set before the timer expires, the UE 103 may switch the corresponding second search space set from the activation state to the deactivation state.

Figure 4:
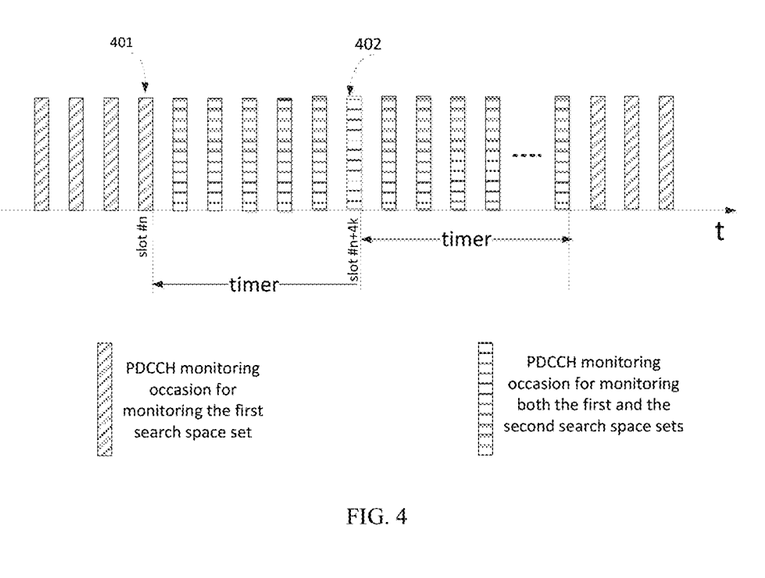
FIG. 4 illustrates a schematic timing diagram for reducing operations of monitoring PDCCH according to some other embodiments of the present application.

For example, FIG. 4 illustrates a schematic timing diagram for reducing operations of monitoring PDCCH according to some embodiments of the present application. Each slot shown in FIG. 4 is a PDCCH monitoring occasion for monitoring one or more search space sets in the activation state by the UE 103.

As shown in FIG. 4, for simplicity, two exemplary search space sets, i.e., a first search space set in the activation state and a second search space set in a deactivation state are configured for a UE 103 via the configuration information. Before slot #n, the first search space set is in an activation state while the second search space set is in a deactivation state. Slot #n may be a PDCCH monitoring occasion for the first search space set. The PDCCH monitoring occasions respectively for the first search space set and the second search space set may be determined based on the offset parameter and periodicity parameter configured for the first search space set and the second search space set, respectively.

At slot #n, the UE 103 may receive an activation-deactivation indication in the first DCI 401 from the BS 101 to trigger switching the second search space set from a deactivation state to an activation state. After receiving the activation-deactivation indication, the UE 103 may switch the second search space set from the deactivation state to the activation state. Accordingly, the UE 103 will monitor both the first search space set in activation state and the second search space set in activation state to detect DCI in the following PDCCH monitoring occasions, respectively. Although FIG. 4 illustrates that the UE 103 monitors the first search space set and the second search space at the same PDCCH monitoring occasions, persons skilled in the art can understand that the PDCCH monitoring occasions respectively for the first search space set and the second search space may be different according to some embodiments of the present application.

In response to the second search space set being switched to the activation state, the UE may start a timer with a period (e.g., slot #n to slot #n+6k) for the second search space set. In the case that further DCI, i.e., the third DCI 402 is received in the second search space set at a PDCCH monitoring occasion (e.g., slot #n+4k) before the timer expires, the UE 103 may restart the timer. In the case that no DCI is received in the second search space set before the timer expires, the UE 103 may switch the second search space set from the activation state to the deactivation state.

Although the above example in FIG. 4 illustrates the procedure for switching one second search space set based on the activation-deactivation indication, persons skilled in the art can understood the above procedure can also be applied to the situation where the at least one second search space set may include two or more second search space sets.

For example, in the case that the at least one second search space set includes two or more second search space sets, after receiving the activation-deactivation indication in first DCI in the first search space set, the UE 103 may switch all of the two or more second search space sets from a deactivation state to an activation state. Then, for each one of the two or more second search space sets being switched to the activation state, the UE 103 may start a corresponding timer for the second search space, and perform the operations for each second search space set according to the rule in FIG. 4.

According to another embodiment of the present application, for each one of the at least one second search space set being switched to the activation state, the UE 103 may not start a timer to control the state switching for the second search space set. Instead, the UE 103 may receive an activation-deactivation indication in the first DCI in the first search space set to trigger switching the at least one second search space set of the plurality of search space sets from an activation state to a deactivation state. In this embodiment, after receiving the activation-deactivation indication, the UE 103 may switch each of the at least one second search space set from the activation state to the deactivation state.

Figure 5:
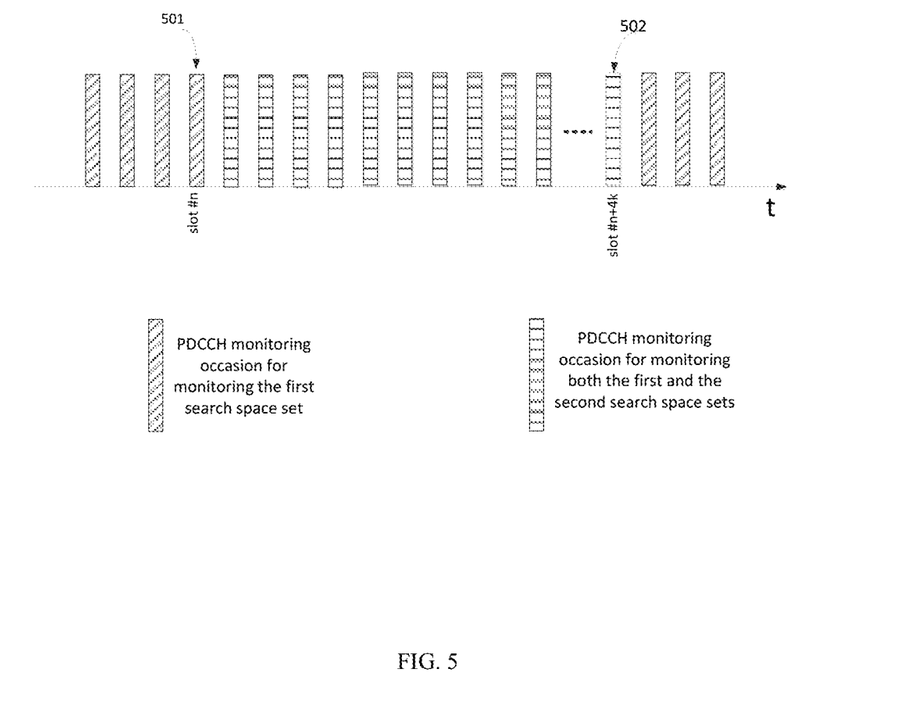
FIG. 5 illustrates a schematic timing diagram for reducing operations of monitoring PDCCH according to some other embodiments of the present application.

For example, FIG. 5 illustrates a schematic timing diagram for reducing operations of monitoring PDCCH according to some embodiments of the present application. Each slot shown in FIG. 5 is a PDCCH monitoring occasion for monitoring one or more search space sets in the activation state by the UE 103.

As shown in FIG. 5, for simplicity, two exemplary search space sets, i.e., a first search space set in the activation state and a second search space set in a deactivation state are configured for a UE 103 via the configuration information. Before slot #n, the first search space set is in an activation state while the second search space set is in a deactivation state. Slot #n may be a PDCCH monitoring occasion for the first search space set. The PDCCH monitoring occasions respectively for the first search space set and the second search space set may be determined based on the offset parameter and periodicity parameter configured for the first search space set and the second search space set, respectively.

At slot #n, the UE 103 may receive an activation-deactivation indication in the first DCI 501 from the BS 101 to trigger switching the second search space set from a deactivation state to an activation state. After receiving the activation-deactivation indication, the UE 103 may switch the second search space set from the deactivation state to the activation state. Accordingly, the UE 103 will monitor both the first search space set in activation state and the second search space set in activation state to detect DCI in the following PDCCH monitoring occasions, respectively. Although FIG. 5 illustrates that the UE 103 monitors the first search space set and the second search space at the same PDCCH monitoring occasions, persons skilled in the art can understand that the PDCCH monitoring occasions respectively for the first search space set and the second search space may be different according to some embodiments of the present application.

After that, at slot #n+T (wherein T is an integer larger than 0), the UE 103 may receive an activation-deactivation indication in another DCI 502 in the first search space set to trigger switching the second search space set from the activation state to a deactivation state, and then the UE 103 may switch the second search space set from the activation state to a deactivation state. For the second search space set in the deactivation state, the UE 103 may not monitor the second search space set to detect DCI at the PDCCH monitoring occasions for the second search space set.

In the above embodiments, the UE 103 needs to monitor the first search space set regardless of whether the at least one second search space set is in an activation state or a deactivation state, which can also solve possible misalignments between UE 103 and BS 101.

Figure 6:
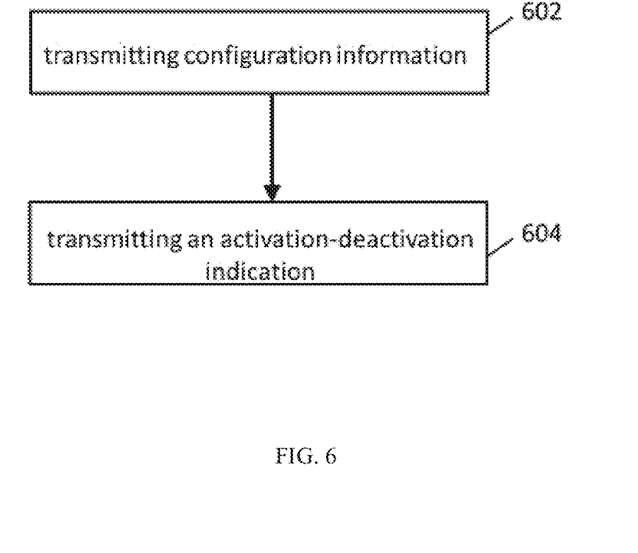
FIG. 6 illustrates a flow chart illustrating a method for reducing operations of monitoring PDCCH according to some other embodiments of the present application.

FIG. 6 is a flow chart illustrating a method for reducing operations of monitoring PDCCH according to some other embodiments of the present application. The method may be performed by a BS 101 as shown in FIG. 1.

As shown in FIG. 6, in step 602, the BS 101 may transmit configuration information to a UE (for example, the UE 103 as shown in FIG. 1). The configuration information may indicate indicating a plurality of search space sets and an activation or deactivation state for each search space set of the plurality of search space sets to the UE 103. Each search space set may be associated with fallback DCI or full capability DCI. The fallback DCI may include at least one of: DCI format 0_0 and DCI format 1_0. The full capability DCI may include at least one of: DCI format 0_1 and DCI format 1_1.

In step 604, the BS 101 may transmit an activation-deactivation indication in first downlink control information (DCI) in a physical resource of a first search space set in an activation state of the plurality of search space sets. The activation-deactivation indication may be configured to: trigger switching at least one second search space set of the plurality of search space sets from a deactivation state to an activation state, or trigger switching the at least one second search space set of the plurality of search space sets from an activation state to a deactivation state. The physical resource may correspond to a resource of a control channel candidate of an aggregation level of a search space set. Accordingly, the physical resource may be determined by the UE 103 based on configuration information for the first search space set and a CORESET associated with the first search space set.

A search space may be a set of candidate control channels formed by control channel elements (CCEs) at a given aggregation level, which the device is supposed to attempt to decode. A search space set is a set of search spaces, each of which is corresponding to an aggregation level. According to some embodiments of the present application, the first search space set in the activation state of the plurality of search spaces may be configured based on a first CORESET, and the at least one second search space set in the deactivation state of the plurality of search spaces may be configured based a second CORESET. In other words, the first search space set in the activation state of the plurality of search spaces may be associated with a first CORESET, and the at least one second search space set in the deactivation state of the plurality of search spaces may be associated with a second CORESET. The association relationship between the search space set and the CORESET can be configured by the BS 101 through a radio resource control (RRC) signalling.

A CORESET may indicate the frequency band occupied by a physical resource in the frequency domain and the number of OFDM symbols occupied by the physical resource in the time domain. According to some embodiments of the application, the first CORESET is the same as the second CORESET. According to some other embodiments of the application, the first CORESET is different from the second CORESET. For example, in an embodiment of the present application, the first CORESET and the second CORESET may be configured with different carrier frequencies. In another embodiment of the application, the first CORESET and the second CORESET may be configured with different bandwidth parts (BWPs). In yet another embodiment of the application, the first CORESET and the second CORESET may be configured with the same BWP but different CORESET configuration parameters. The CORESET configuration parameters may include parameters for configuring the CORESET in the existing technology or future, e.g., the number of OFDM symbols occupied by the CORESET in the time domain.

In an embodiment of the present application, the first search space set in an activation state may be associated with fallback DCI. That is, the first DCI may be fallback DCI. The fallback DCI may include at least one of: DCI format 0_0; and DCI format 1_0.

In another embodiment of the present application, the at least one second search space set may be associated with full capability DCI. The full capability DCI may include at least one of: DCI format 0_1; and DCI format 1_1.

In yet another embodiment of the present application, the first DCI is one of the following: DCI for scheduling a physical uplink shared channel (PUSCH) transmission; DCI for scheduling a physical downlink shared channel (PDSCH) transmission; and DCI dedicated for search space set activation and deactivation.

According to some embodiments of the present application, for efficient data transmission, the BS 101 may decide to activate at least one second search space. Accordingly, the BS 101 may switch the at least one second search space from the deactivation state to the activation state. For example, the BS 101 may mark the at least one second search space to be in the activation state. Then, the BS 101 may transmit the activation-deactivation indication in the first DCI in the physical resource of the first search space set so as to trigger switching at least one second search space set of the plurality of search space sets from a deactivation state to an activation state for the UE 103.

After that, the BS 101 may switch the first search space set from the activation state to the deactivation state (e.g., making the first search space set to be in the deactivation state). At the same time or after that, the BS 101 may transmit second DCI in the any one of the at least one second search space set to the UE 103, such that the UE 103 may receive DCI in the at least one second search space set, and thus the UE 103 may switch the first search space from the activation state to the deactivation state.

For each second search space set wherein the second DCI is transmitted, the UE 103 may start a timer (e.g., the timer as shown in FIG. 3) in response to transmitting the second DCI. In the case that third DCI is transmitted in the second search space set before the timer expires, the BS 101 may restart the timer. In the case that no DCI is transmitted in the second search space set before the timer expires, the BS 103 may switch the second search space set from the activation state to the deactivation state and switch the first search space set from the deactivation state to the activation state. In an embodiment of the present application, each second search space set of the at least one second search space set may be associated with a corresponding timer with a period. The period may be configured by the BS 101. The timers for the different second search space sets may be the same or different from each other.

According to some other embodiments of the present application, for efficient data transmission, the BS 101 may decide to activate at least one second search space. Accordingly, the BS 101 may switch the at least one second search space from the deactivation state to the activation state. For example, the BS 101 may mark the at least one second search space to be in the activation state. In these embodiments, the BS 101 may not switch the first search space set from the deactivation state to the activation state, but retain the first search space set in the activation state regardless of whether the at least one second search space is in the deactivation state or in the activation state.

In an embodiment of the present application, the BS 101 may start a timer (e.g., the timer as shown in FIG. 4) for each second search space set respectively in response to the at least one second search space set being switched to the activation state. In the case that third DCI is received in the corresponding second search space set before the timer expires, the UE may restart the timer. In the case that no DCI is received in the corresponding second search space set before the timer expires, the UE 103 may switch the corresponding second search space set from the activation state to the deactivation state.

In another embodiment of the present application, for each one of the at least one second search space set being switched to the activation state, the BS 101 may not start a timer to control the state switching for the second search space set. Instead, the BS 101 itself may determine when to switch the at least one second search space set from the activation state to the deactivation state. For example, the BS 101 itself may mark the at least one second search space set to be in the deactivation state from a time point (e.g., slot #n+T at shown in FIG. 5). In this embodiment, the BS 101 may transmit another activation-deactivation indication in the first DCI in the first search space set to trigger switching the at least one second search space set of the plurality of search space sets from an activation state to a deactivation state for the UE 103 in the time point, such that the UE 103 may switch each of the at least one second search space set from the activation state to the deactivation state, after receiving the activation-deactivation indication.

Figure 7:
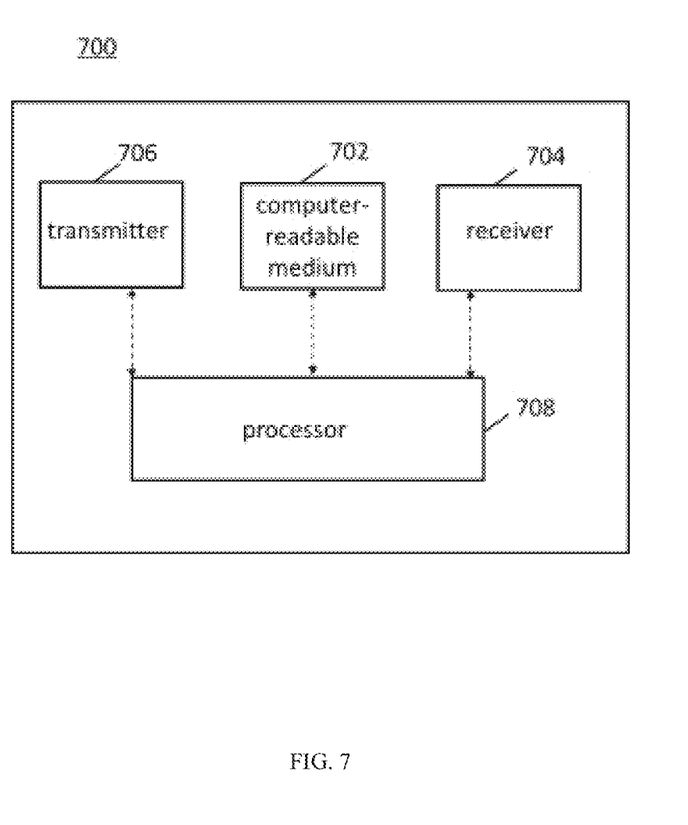
FIG. 7 illustrates a simplified block diagram of an apparatus for reducing operations of monitoring PDCCH according to some embodiments of the present application.

FIG. 7 illustrates a simplified block diagram of an apparatus 700 for reducing operations of monitoring PDCCH according to some embodiments of the present application. The apparatus 700 may be a UE 103 as shown in FIG. 1.

Referring to FIG. 7, the apparatus 700 may include at least one non-transitory computer-readable medium 702, at least one receiver 704, at least one transmitter 706, and at least one processor 708. In some embodiment of the present application, at least one receiver 704 and at least one transmitter 706 and be integrated into at least one transceiver. The at least one non-transitory computer-readable medium 702 may have computer executable instructions stored therein. The at least one processor 708 may be coupled to the at least one non-transitory computer-readable medium 702, the at least one receiver 704 and the at least one transmitter 706. The computer executable instructions can be programmed to implement a method with the at least one receiver 704, the at least one transmitter 706 and the at least one processor 708. The method can be a method according to an embodiment of the present application, for example, the method shown in FIG. 2.

Figure 8:
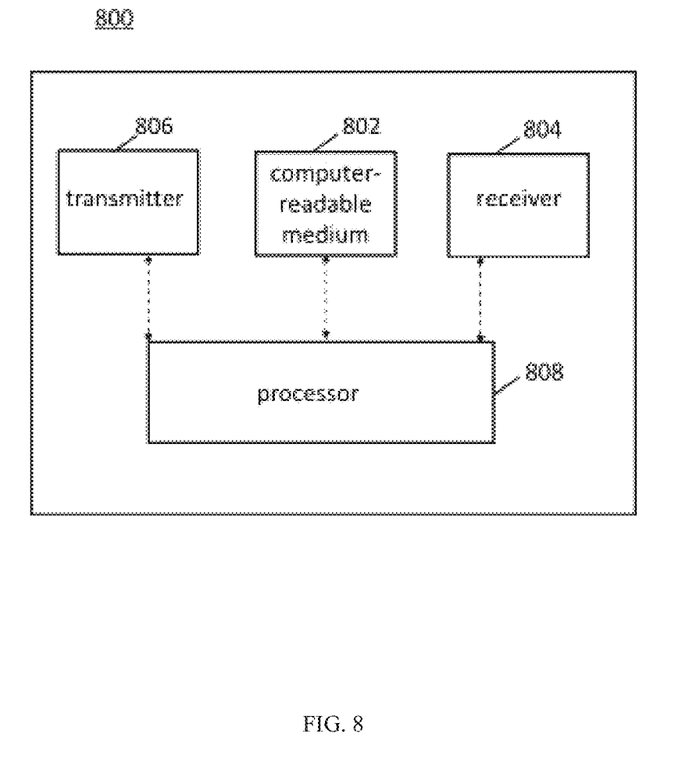
FIG. 8 illustrates a simplified block diagram of an apparatus for reducing operations of monitoring PDCCH according to some other embodiments of the present application.

FIG. 8 illustrates a simplified block diagram of an apparatus 800 for reducing operations of monitoring PDCCH according to some other embodiments of the present application. The apparatus 800 may be a base station 101 as shown in FIG. 1.

Referring to FIG. 8, the apparatus 800 may include at least one non-transitory computer-readable medium 802, at least one receiver 804, at least one transmitter 806, and at least one processor 808. In some embodiment of the present application, at least one receiver 804 and at least one transmitter 806 and be integrated into at least one transceiver. The at least one non-transitory computer-readable medium 802 may have computer executable instructions stored therein. The at least one processor 808 may be coupled to the at least one non-transitory computer-readable medium 802, the at least one receiver 804 and the at least one transmitter 806. The computer executable instructions can be programmed to implement a method with the at least one receiver 804, the at least one transmitter 806 and the at least one processor 808 The method can be a method according to an embodiment of the present application, for example, the method shown in FIG. 6.

The method according to embodiments of the present application can also be implemented on a programmed processor. However, the controllers, flowcharts, and modules may also be implemented on a general purpose or special purpose computer, a programmed microprocessor or microcontroller and peripheral integrated circuit elements, an integrated circuit, a hardware electronic or logic circuit such as a discrete element circuit, a programmable logic device, or the like. In general, any device on which resides a finite state machine capable of implementing the flowcharts shown in the figures may be used to implement the processor functions of this application. For example, an embodiment of the present application provides an apparatus for emotion recognition from speech, including a processor and a memory. Computer programmable instructions for implementing a method for emotion recognition from speech are stored in the memory, and the processor is configured to perform the computer programmable instructions to implement the method for emotion recognition from speech. The method may be a method as stated above or other method according to an embodiment of the present application.

An alternative embodiment preferably implements the methods according to embodiments of the present application in a non-transitory, computer-readable storage medium storing computer programmable instructions. The instructions are preferably executed by computer-executable components preferably integrated with a network security system. The non-transitory, computer-readable storage medium may be stored on any suitable computer readable media such as RAMs, ROMs, flash memory, EEPROMs, optical storage devices (CD or DVD), hard drives, floppy drives, or any suitable device. The computer-executable component is preferably a processor but the instructions may alternatively or additionally be executed by any suitable dedicated hardware device. For example, an embodiment of the present application provides a non-transitory, computer-readable storage medium having computer programmable instructions stored therein. The computer programmable instructions are configured to implement a method for emotion recognition from speech as stated above or other method according to an embodiment of the present application.

While this application has been described with specific embodiments thereof, it is evident that many alternatives, modifications, and variations may be apparent to those skilled in the art. For example, various components of the embodiments may be interchanged, added, or substituted in the other embodiments. Also, all of the elements of each figure are not necessary for operation of the disclosed embodiments. For example, one of ordinary skill in the art of the disclosed embodiments would be enabled to make and use the teachings of the application by simply employing the elements of the independent claims. Accordingly, embodiments of the application as set forth herein are intended to be illustrative, not limiting. Various changes may be made without departing from the spirit and scope of the application.

The invention claimed is:

1. A method performed by a user equipment (UE), the method comprising:
receiving configuration information indicating a plurality of search space sets and an activation or deactivation state for each search space set of the plurality of search space sets;
receiving an activation-deactivation indication in first downlink control information (DCI) for scheduling physical downlink shared channel (PDSCH) or for scheduling physical uplink shared channel (PUSCH), wherein the DCI is received in a first search space set in an activation state of the plurality of search space sets, and the activation-deactivation indication is configured to:
trigger switching at least one second search space set of the plurality of search space sets from a deactivation state to the activation state; or
trigger switching the at least one second search space set of the plurality of search space sets from the activation state to the deactivation state;
starting a timer for the second search space set in which the second DCI is received in response to receiving the second DCI;
in a case that third DCI is received in the second search space set before the timer expires, restarting the timer; and
in a case that no DCI is received in the second search space set before the timer expires:
switching the second search space set from the activation state to the deactivation state; and
switching the first search space set from the deactivation state to the activation state.

2. The method of claim 1, wherein the first search space set in the activation state of the plurality of search spaces is configured based on a first control resource set (CORESET), and the at least one second search space set in the deactivation state of the plurality of search spaces is configured based on a second CORESET.

3. The method of claim 2, wherein the first CORESET is the same as the second CORESET.

4. The method of claim 2, wherein the first CORESET and the second CORESET are configured with different carrier frequencies.

5. The method of claim 2, wherein the first CORESET and the second CORESET are configured with different bandwidth parts (BWPs).

6. The method of claim 2, wherein the first CORESET and the second CORESET are configured with a same bandwidth part (BWP) but different CORESET configuration parameters.

7. A user equipment (UE) for wireless communication, comprising:
at least one memory; and
at least one processor coupled with the at least one memory and configured to cause the UE to:
receive configuration information indicating a plurality of search space sets and an activation or deactivation state for each search space set of the plurality of search space sets;
receive an activation-deactivation indication in first downlink control information (DCI) for scheduling physical downlink shared channel (PDSCH) or physical uplink shared channel (PUSCH), wherein the DCI is received in a first search space set in an activation state of the plurality of search space sets, and the activation-deactivation indication is configured to:
trigger switching at least one second search space set of the plurality of search space sets from a deactivation state to the activation state; or
trigger switching the at least one second search space set of the plurality of search space sets from the activation state to the deactivation state;
start a timer for the second search space set in which the second DCI is received in response to receiving the second DCI;
in a case that third DCI is received in the second search space set before the timer expires, restart the timer; and
in a case that no DCI is received in the second search space set before the timer expires:

switch the second search space set from the activation state to the deactivation state; and
switch the first search space set from the deactivation state to the activation state.

8. The UE of claim 7, wherein the first search space set in the activation state of the plurality of search spaces is configured based on a first control resource set (CORESET), and the at least one second search space set in the deactivation state of the plurality of search spaces is configured based on a second CORESET.

9. The UE of claim 8, wherein the first CORESET is the same as the second CORESET.

10. The UE of claim 8, wherein the first CORESET and the second CORESET are configured with different carrier frequencies.

11. The UE of claim 8, wherein the first CORESET and the second CORESET are configured with different bandwidth parts (BWPs).

12. The UE of claim 8, wherein the first CORESET and the second CORESET are configured with a same bandwidth part (BWP) but different CORESET configuration parameters.

13. The UE of claim 7, wherein the first DCI is a fallback DCI, and the fallback DCI comprises at least one of:
DCI format 0_0; and
DCI format 1_0.

14. The UE of claim 7, wherein the at least one second search space set is associated with a full capability DCI, and wherein the full capability DCI comprises at least one of:
DCI format 0_1; and
DCI format 1_1.

15. The UE of claim 7, wherein the first DCI is one of:
DCI for scheduling the PUSCH;
DCI for scheduling the PDSCH; and
DCI dedicated for search space set activation and deactivation.

16. The UE of claim 7, wherein the at least one processor is further configured to cause the UE to:
switch the at least one second search space set from the deactivation state to the activation state in response to receiving the activation-deactivation indication in the first search space set;
monitor both the first search space set and the at least one second search space set after receiving the first DCI; and
in response to receiving second DCI in any one of the at least one second search space set,
switch the first search space set from the activation state to the deactivation state.

17. The UE of claim 7, wherein the at least one processor is further configured to cause the UE to:
switch the at least one second search space set from the deactivation state to the activation state in response to receiving the activation-deactivation indication in the first search space set; and
monitor both the first search space set and the at least one second search space set after receiving the first DCI.

18. The UE of claim 17, wherein the at least one processor is further configured to cause the UE to:
start a timer for each second search space set respectively in response to the at least one second search space set being switched to the activation state;
in a case that third DCI is received in a corresponding second search space set before the timer expires, restart the timer; and
in a case that no DCI is received in the corresponding second search space set before the timer expires, switch the corresponding second search space set from the activation state to the deactivation state.

19. A base station for wireless communication, comprising:
at least one memory; and
at least one processor coupled with the at least one memory and configured to cause the base station to:
transmit configuration information indicating a plurality of search space sets and an activation or deactivation state for each search space set of the plurality of search space sets;
transmit an activation-deactivation indication in first downlink control information (DCI) for scheduling physical downlink shared channel (PDSCH) or physical uplink shared channel (PUSCH), wherein the DCI is transmitted in a physical resource of a first search space set in an activation state of the plurality of search space sets, and the activation-deactivation indication is configured to:
trigger switching at least one second search space set of the plurality of search space sets from a deactivation state to the activation state, or
trigger switching the at least one second search space set of the plurality of search space sets from the activation state to the deactivation state;
start a timer for the second search space set in which the second DCI is received in response to receiving the second DCI;
in a case that third DCI is received in the second search space set before the timer expires, restart the timer; and
in a case that no DCI is received in the second search space set before the timer expires:
switch the second search space set from the activation state to the deactivation state; and
switch the first search space set from the deactivation state to the activation state.

20. A method performed by a base station, the method comprising:
transmitting configuration information indicating a plurality of search space sets and an activation or deactivation state for each search space set of the plurality of search space sets;
transmitting an activation-deactivation indication in first downlink control information (DCI) for scheduling physical downlink shared channel (PDSCH) or physical uplink shared channel (PUSCH), wherein the DCI is transmitted in a physical resource of a first search space set in an activation state of the plurality of search space sets, and the activation-deactivation indication is configured to:
trigger switching at least one second search space set of the plurality of search space sets from a deactivation state to the activation state; or
trigger switching the at least one second search space set of the plurality of search space sets from the activation state to the deactivation state;
starting a timer for the second search space set in which the second DCI is received in response to receiving the second DCI;
in a case that third DCI is received in the second search space set before the timer expires, restarting the timer; and
in a case that no DCI is received in the second search space set before the timer expires:
switching the second search space set from the activation state to the deactivation state; and switching the first search space set from the deactivation state to the activation state.

\* \* \* \* \*